(12) United States Patent
Liu

(10) Patent No.: US 11,935,176 B2
(45) Date of Patent: Mar. 19, 2024

(54) FACE IMAGE DISPLAYING METHOD AND APPARATUS, ELECTRONIC DEVICE, AND STORAGE MEDIUM

(71) Applicant: Beijing Bytedance Network Technology Co., Ltd., Beijing (CN)

(72) Inventor: Jiacheng Liu, Beijing (CN)

(73) Assignee: BEIJING BYTEDANCE NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/060,128

(22) Filed: Nov. 30, 2022

(65) Prior Publication Data
US 2023/0090457 A1    Mar. 23, 2023

Related U.S. Application Data

(63) Continuation of application No. PCT/CN2021/114237, filed on Aug. 24, 2021.

(30) Foreign Application Priority Data

Sep. 17, 2020 (CN) .......................... 202010981627.5

(51) Int. Cl.
*G06T 15/00* (2011.01)
(52) U.S. Cl.
CPC ................... *G06T 15/005* (2013.01)
(58) Field of Classification Search
None
See application file for complete search history.

(56) References Cited

U.S. PATENT DOCUMENTS

| 2006/0048076 | A1* | 3/2006 | Vronay | G06F 3/0482 |
|---|---|---|---|---|
| | | | | 715/850 |
| 2013/0080976 | A1* | 3/2013 | Zambrano | G06F 3/0485 |
| | | | | 715/830 |

(Continued)

FOREIGN PATENT DOCUMENTS

| CN | 105357466 A | 2/2016 |
|---|---|---|
| CN | 109034063 A | 12/2018 |

(Continued)

OTHER PUBLICATIONS

China National Intellectual Property Administration, Notice of Allowance issued in Chinese Application No. 202010981627.5, dated May 7, 2022, 1 pages.

(Continued)

*Primary Examiner* — Robert Bader
(74) *Attorney, Agent, or Firm* — Alleman Hall & Tuttle LLP

(57) ABSTRACT

The present disclosure provides a face image displaying method and apparatus, an electronic device and a storage medium. According to the face image displaying method provided in the present application, the interactivity during a face image displaying process is enhanced by means of displaying dynamically a face mask sequence in accordance with a preset motion mode at a preset relative position of a face of an object, and fusing, after a target face mask of the face mask sequence is triggered by a user, the target face mask to the face of the object for display; and the effect of displaying a specific face mask on a face of an object can be achieved by means of fusing, after a target face mask is triggered by a user, the target face mask to the face of the object for display.

20 Claims, 7 Drawing Sheets

(56) References Cited

U.S. PATENT DOCUMENTS

| | | | |
|---|---|---|---|
| 2017/0092002 A1* | 3/2017 | Mullins | G02B 27/0172 |
| 2017/0163958 A1 | 6/2017 | Hu | |
| 2017/0352092 A1* | 12/2017 | Mitchell | G06T 15/503 |
| 2018/0000179 A1 | 1/2018 | Simon et al. | |
| 2018/0182144 A1 | 6/2018 | Moto et al. | |
| 2019/0050427 A1* | 2/2019 | Wiesel | G06T 19/00 |
| 2019/0130652 A1* | 5/2019 | Yu | G06F 3/011 |
| 2021/0067756 A1* | 3/2021 | Goodrich | G06T 7/571 |
| 2021/0258511 A1* | 8/2021 | Goodrich | H04L 51/18 |
| 2021/0319625 A1* | 10/2021 | Goodrich | G06T 5/005 |

FOREIGN PATENT DOCUMENTS

| | | |
|---|---|---|
| CN | 109410119 A | 3/2019 |
| CN | 110619615 A | 12/2019 |
| CN | 110992493 A | 4/2020 |
| CN | 111494934 A | 8/2020 |
| CN | 112099712 A | 12/2020 |
| IN | 110322416 A | 10/2019 |
| WO | 2018219120 A1 | 12/2018 |

OTHER PUBLICATIONS

China National Intellectual Property Administration, Office action issued in Chinese Application No. 202010981627.5, dated Aug. 17, 2021, 12 pages. (Submitted with English Summary of Office action).
ISA China Patent Office, International Search Report and Written Opinion issued in Application No. PCT/ CN2021/114237, dated Nov. 23, 2021, WIPO, 12 pages.
European Patent Office, Extended European Search Report Issued in Application No. 21868404.1, dated Nov. 7, 2023, Germany, 8 pages.

* cited by examiner

FACE IMAGE DISPLAYING METHOD AND APPARATUS, ELECTRONIC DEVICE, AND STORAGE MEDIUM

CROSS-REFERENCE TO RELATED APPLICATIONS

The present disclosure is a continuation of International Application No. PCT/CN2021/114237, which claims priority to Chinese Patent Application No. 202010981627.5, titled "FACE IMAGE DISPLAYING METHOD AND APPARATUS, ELECTRONIC DEVICE, AND STORAGE MEDIUM", filed to China National Intellectual Property Administration on Sep. 17, 2020. The disclosures of the above applications are hereby incorporated by reference in their entireties.

TECHNICAL FIELD

The present disclosure relates to the field of image processing technologies and, more specifically, to a face image displaying method and apparatus, an electronic device and a storage medium.

BACKGROUND

With the development of science and technology, the display of face images has also derived many application scenarios, under some of which, users hope that the face images can be displayed after processing.

Although existing applications can perform various kinds of processing on face images through image processing and display the processed face images, the existing applications cannot meet users' needs for the diversity of interaction modes in a face image displaying process.

SUMMARY

The present disclosure provides a face image displaying method and apparatus, an electronic device, and a storage medium, which are used for solving the technical problem that users' needs for the diversity of interaction modes in a face image displaying process cannot be met at present.

In a first aspect, an embodiment of the present disclosure provides a face image displaying method, including:
  displaying dynamically a face mask sequence in accordance with a preset motion mode at a preset relative position of a face of an object, where the face mask sequence includes a plurality of face masks corresponding to the face of the object;
  in response to a trigger instruction acting on a target face mask, fusing the target face mask to the face of the object for display, where the target face mask is any face mask of the face mask sequence.

In a second aspect, an embodiment of the present disclosure provides a face image displaying apparatus, including:
  a display module, configured to display dynamically a face mask sequence in accordance with a preset motion mode at a preset relative position of a face of an object, where the face mask sequence includes a plurality of face masks corresponding to the face of the object;
  an acquiring module, configured to acquire a trigger instruction acting on a target face mask; and
  a processing module, configured to fuse the target face mask to the face of the object, where the target face mask is any face mask of the face mask sequence;
  where the display module is further configured to display the face of the object to which the target face mask is fused.

In a third aspect, an embodiment of the present disclosure provides an electronic device, including:
  at least one processor and a memory;
  where the memory stores computer-executable instructions; and the at least one processor executes the computer-executable instructions stored in the memory, so that the face image displaying method according to the first aspect and various possible designs of the first aspect mentioned above is executed by the at least one processor.

In a fourth aspect, an embodiment of the present disclosure provides a computer-readable storage medium, in which computer-executable instructions are stored. The computer-executable instructions, when executed by a processor, implement the face image displaying method according to the first aspect and various possible designs of the first aspect mentioned above.

In a fifth aspect, an embodiment of the present disclosure provides a computer program product, including a computer program, where the computer program, when executed by a processor, implements the face image displaying method according to the first aspect and various possible designs of the first aspect mentioned above.

In a sixth aspect, an embodiment of the present disclosure provides a computer program. The computer program, when executed by a processor, implements the face image displaying method according to the first aspect and various possible designs of the first aspect mentioned above.

According to the face image displaying method and apparatus, the electronic device and the storage medium provided in the embodiments of the present disclosure, the interactivity during a face image displaying process is enhanced by means of displaying dynamically a face mask sequence in accordance with a preset motion mode at a preset relative position of a face of an object, and fusing, after a target face mask of the face mask sequence is triggered by a user, the target face mask to the face of the object for display; and the effect of displaying a specific face mask on a face of an object can be achieved by means of fusing, after a target face mask is triggered by a user, the target face mask to the face of the object for display.

BRIEF DESCRIPTION OF THE DRAWINGS

In order to illustrate the technical solutions of the embodiments of the present disclosure or the prior art more clearly, the drawings required for the description of the embodiments or the prior art will be briefly introduced below. Obviously, the drawings in the following description are intended for some embodiments of the present disclosure; and for those of ordinary skill in the art, other drawings can be obtained according to these drawings without making creative efforts.

DESCRIPTION OF EMBODIMENTS

Figure 1:
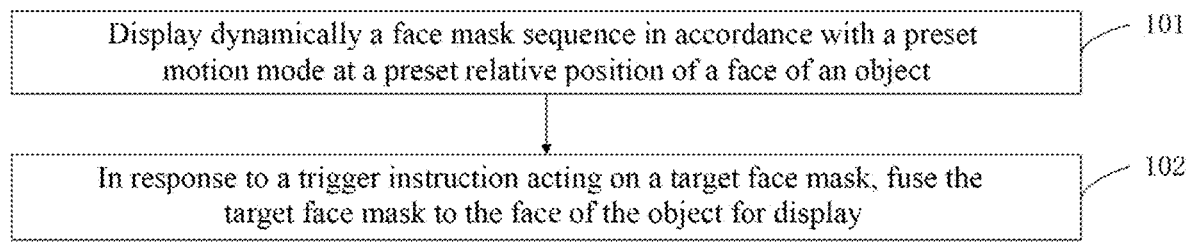
FIG. 1 is a schematic flowchart of a face image displaying method shown according to an example embodiment of the present disclosure.

The embodiments of the present disclosure will be described in more detail in the following with reference to the drawings. Although some embodiments of the present disclosure are represented in the drawings, it should be understood that the present disclosure can be implemented in various forms, and should not be interpreted as being limited to the embodiments described herein; on the contrary, these embodiments are provided to help to understand the present disclosure more thoroughly and comprehensively. It should be understood that the drawings and embodiments of the present disclosure are merely used as examples, and not to limit the protection scope of the present disclosure.

It should be understood that respective steps recited in method implementations of the present disclosure can be executed in different orders, and/or be executed in parallel. In addition, the method implementations may include additional steps and/or omit execution of shown steps. The scope of the present disclosure is not limited to this aspect.

The term "include" used herein and its variations are open inclusion, that is, "include but not limited to". The term "based on" means "at least partly based on". The term "an embodiment" represents "at least one embodiment"; the term "another embodiment" represents "at least one another embodiment"; and the term "some embodiments" represents "at least some embodiments". Related definitions of other terms will be provided in the following.

It should be noted that concepts such as "first", and "second" mentioned in the present disclosure are merely used to distinguish different apparatuses, modules, or units, but not to limit the sequence or interdependency of functions executed by these apparatuses, modules, or units.

It should be noted that the singular or plural modification mentioned in the present disclosure is illustrative and not restrictive, and those skilled in the art should understand that it should be understood as "one or more" unless clearly defined in the context otherwise.

At present, there are various ways to process a face image, for example, the face image can be beautified and deformed. Many application scenarios are derived for a processed face image, in which the processed face image is directly applied, thus being unable to meet the users' needs for the diversity of interaction modes in a face image displaying process.

In the embodiments provided by the present disclosure, a user can first generate a face mask sequence according to a face of an object after obtaining the face of the object through a terminal device (e.g., a personal computer, a notebook computer, a tablet computer, a smartphone, and other devices), where the face mask sequence includes a plurality of face masks therein. It is worthy of note that a face mask of the face mask sequence can be a face mask directly corresponding to the face of the object, or a face mask generated after relevant processing (e.g., deforming processing, beautifying processing) for the face of the object. In addition, in an embodiment, the face mask sequence may include therein a plurality of masks corresponding to different facial morphologies.

After the face mask sequence is generated, the face masks of the face mask sequence can be arranged in accordance with a specific distribution rule. For example, the face masks of the face mask sequence can be arranged in accordance with a preset circumferential direction, where the preset circumferential direction may be a direction in which the effect that the face mask sequence surrounds the face of the object is formed with the face of the object as a center and an overhead direction of the face of the object as a central axis. Moreover, the face mask sequence can also be displayed dynamically in accordance with a preset motion mode, for example, the face mask sequence can rotate around the face of the object.

In addition, a rotation speed at which the face mask sequence rotates around the face of the object can be determined according to a physical feature of a user, for example, it can be determined according to a mouth opening degree of the user, a smile degree of the user, and a related gesture of the user. Here, illustration can be made by taking an example where the rotation speed is determined according to the mouth opening degree of the user. The rotation speed at which the face mask sequence rotates around the face of the object can increase with the mouth opening degree of the user, that is, the larger the mouth opening degree of the user, the faster the speed at which the face mask sequence rotates around the face of the object. It can be seen that the user, by adjusting the opening degree of the mouth, can accelerate and decelerate the rotation speed at which the face mask sequence rotates around the face of the object.

When the user triggers any mask of the face mask sequence, for example, the user selects a mask of the face mask sequence by clicking a screen, it is a target face mask. After the triggering, the speed at which the face mask sequence rotates around the face of the object will first decrease until the target face mask moves directly in front of the face of the object. At this time, the rotation of the face mask sequence can be stopped, and the target face mask can be fused onto the face of the object for display. Furthermore, other face masks of the face mask sequence other than the target face mask can be faded out in accordance with a preset transparency change rule.

In the embodiment provided by the present disclosure, through dynamically displaying a face mask sequence in accordance with a preset motion mode at a preset relative position of a face of an object, and fusing, after a target face mask of the face mask sequence is triggered by a user, the target face mask to the face of the object for display, an effect that the display mode of the face mask sequence is interactive with the face of the object is realized before the target face mask is triggered by the user; and, the target face mask is fused to the face of the object for display after the target face mask is triggered by the user, which can achieve the effect of displaying a specific face mask on the face of the object. The image processing method will be described in detail below through several specific implementations.

FIG. 1 is a schematic flowchart of a face image displaying method shown according to an example embodiment of the present disclosure. As shown in FIG. 1, the face image displaying method provided according to this embodiment includes the following steps.

Step 101, display dynamically a face mask sequence in accordance with a preset motion mode at a preset relative position of a face of an object.

In this step, after a user obtains the face of the object through a terminal device, the face mask sequence can be displayed dynamically in accordance with the preset motion mode at the preset relative position of the face of the object, where the face mask sequence can include a plurality of face masks corresponding to the face of the object. It is worthy of note that a face mask of the face mask sequence can be a face mask generated without processing for the face of the object or a face mask generated after relevant processing (e.g., deforming processing, beautifying processing) for the face of the object. For the above-mentioned generation of the face mask according to the face of the object, a related 3D face processing tool can be used. In addition, in an embodiment, the face mask sequence may include therein a plurality of masks corresponding to different facial morphologies.

After the face mask sequence is generated, the face masks of the face mask sequence can be arranged in accordance with a specific distribution rule. For example, the face masks of the face mask sequence can be arranged in accordance with a preset circumferential direction, or the face masks of the face mask sequence can also be arranged in accordance with a manner in which they are arranged successively in a preset direction.

In an implementation, when the face masks of the face mask sequence can be arranged in accordance with a preset circumferential direction, the preset circumferential direction can be a direction in which the effect that the face mask sequence surrounds the face of the object is formed with the face of the object as the center and the overhead direction of the face of the object as the central axis. Moreover, the face mask sequence can also be displayed dynamically in accordance with the preset motion mode, for example, the face mask sequence can rotate around the face of the object.

When the face masks of the face mask sequence are arranged in accordance with the manner in which the face masks are arranged successively in the preset direction, the face mask sequence can slide in front of the face of the object in accordance with the order in which the face masks are arranged.

It is worth noting that a specific arrangement of the face mask sequence and a relative motion between the face mask sequence and the face of the object are not specifically limited in this embodiment, and the specific forms can be set adaptively according to the specific scenario requirements. In this embodiment, it is intended to exemplarily illustrate that there is a specific relative position relationship and relative motion relationship between the face of the object and the face mask sequence.

Step 102, in response to a trigger instruction acting on a target face mask, fuse the target face mask to the face of the object for display.

When a user triggers any mask of the face mask sequence, for example, the user selects a face mask of the face mask sequence by clicking a screen, it is a target face mask. After the triggering, the speed at which the face mask sequence rotates around the face of the object will first decrease until the target face mask moves directly in front of the face of the object. At this time, the rotation of the face mask sequence can be stopped, and the target face mask can be fused onto the face of the object for display. Furthermore, other face masks of the face mask sequence other than the target face mask can be faded out in accordance with a preset transparency change rule.

In this embodiment, the interactivity in a face image displaying process is enhanced by means of dynamically displaying a face mask sequence in accordance with a preset motion mode at a preset relative position of a face of an object, and fusing, after a target face mask of the face mask sequence is triggered by a user, the target face mask to the face of the object for display, and the effect of displaying a specific face mask on a face of an object can be achieved by means of fusing, after a target face mask is triggered by a user, the target face mask the face of the object for display, thereby enhancing the fun and experience of the user interaction.

In the embodiment mentioned above, the face masks included in the face mask sequence may include an original face mask corresponding to the face of the object, and may also include a deformed face mask generated by processing the original face mask with a 3D face processing tool. For example, the face mask sequence may include eight face masks, in which two original face masks and six deformed face masks are included. Specifically, eight face mask entities can be created first, then a pre-designed 3D model with a deformation effect is imported, and a deformer is added to each face mask entity to adjust a corresponding deformation degree. Since each face mask has a different deformation form, each deformation form needs to be imported separately, and multiple deformers can also be integrated into the same model.

Figure 2:
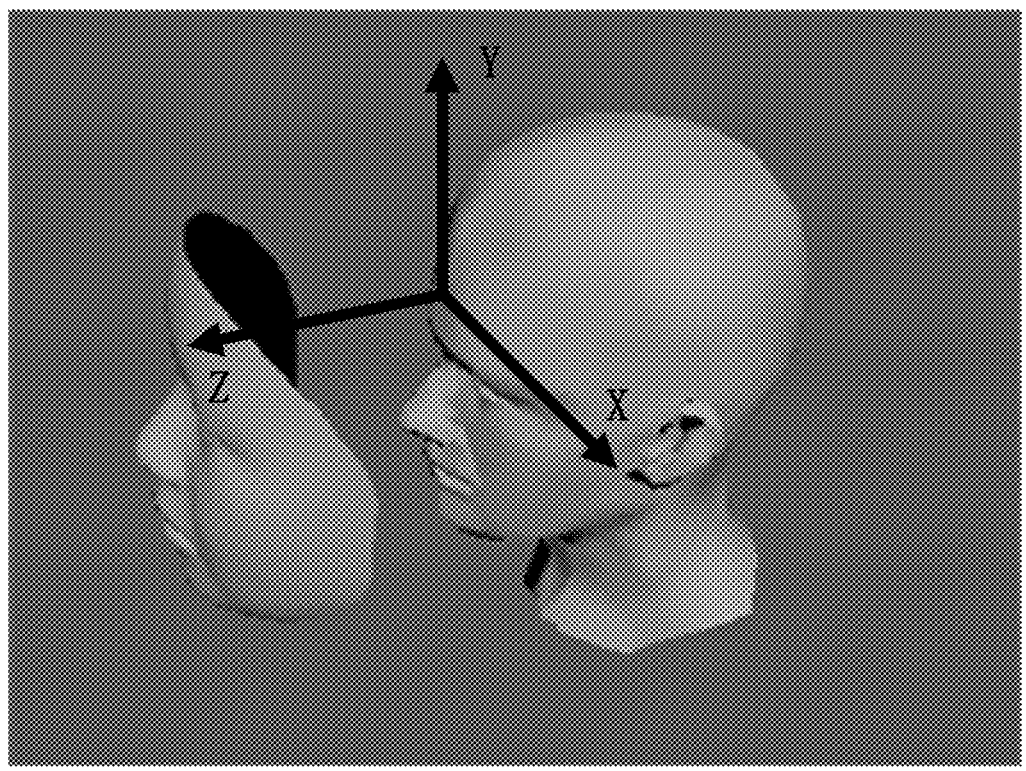
FIG. 2 is a schematic diagram of generating a single face mask shown according to an example embodiment of the present disclosure.

A default initial position of the face mask generated by the 3D face processing tool is consistent with that of the original face due to the setting of the underlying algorithm. In order to display the generated face mask to the preset relative position of the face of the object, the generated face mask can be shifted, selected, and scaled in a face coordinate system of model space. FIG. 2 is a schematic diagram of generating a single face mask shown according to an example embodiment of the present disclosure. As shown in FIG. 2, an original vertex position of the face mask before deforming and a position offset of the face mask after deforming in the current model space can be obtained. Then, since it is necessary to ensure that the face mask is always displayed outwards relative to the face of the object, a displacement operation needs to be performed first, and then a rotation operation.

Specifically, it is possible to add the sum of the original vertex position and the position offset after the deformation to a coordinate offset on a Z-axis, so as to realize an offset from the original position of the face of the object. In addition, in order to make the face mask not completely occlude the face of the object when the face mask rotates around the face of the object in a circle, the generated face mask can also be scaled, for example, to 90% of the original size, so that each face mask of the face mask sequence is a scaled face mask corresponding to the face of the object. It can be seen that through the method mentioned above, it is possible to realize that a face mask scaled in a certain scale can be displayed at a position from which the face of the object deviates by a preset distance, and reference may be made to FIG. 2 for a specific effect.

In order to enable the face mask to be displayed dynamically in accordance with the preset motion mode, for example, in order to enable the face mask to rotate around the face of the object, with the face of the object as the center and the overhead direction of the face of the object as the central axis (for example, Y-axis), rotation can be performed through the following rotation matrix:

$$R_y(\theta) = \begin{bmatrix} \cos\theta & 0 & \sin\theta \\ 0 & 1 & 0 \\ -\sin\theta & 0 & \cos\theta \end{bmatrix}$$

where θ is a rotation angle.

It can be seen that, through the method mentioned above, it is possible to implement, with the face of the object as the center and the overhead direction as the central axis, the rotation motion in a circle of a specified radius after a single face mask is scaled to 90% of its original size, where the frontal face of the face mask always faces outward.

In addition, after the dynamic display of a single face mask is realized, it is possible to further realize the dynamic display of the face mask sequence in accordance with the preset motion mode at the preset relative position of the face of the object. The case where the face mask sequence includes eight face masks can be taken as an example for illustration.

Figure 3:
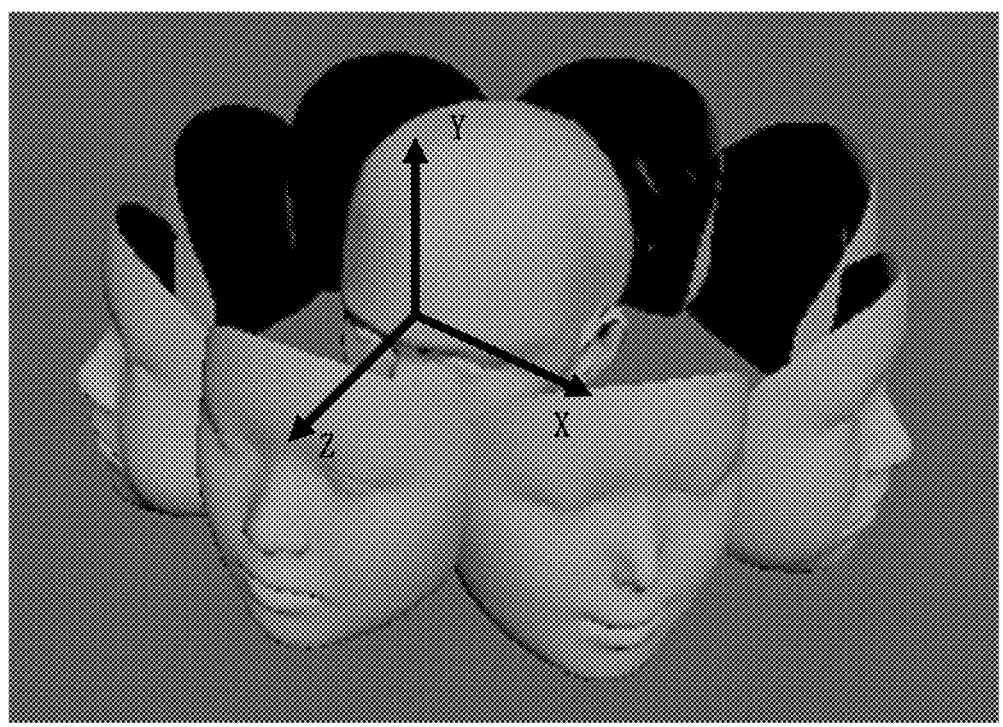
FIG. 3 is a schematic diagram of generating a face mask sequence shown according to an example embodiment of the present disclosure.

FIG. 3 is a schematic diagram of generating a face mask sequence shown according to an example embodiment of the present disclosure. As shown in FIG. 3, when position parameters of respective face masks of the face mask sequence are initialized, the same deviation displacement and scaling ratio can be assigned thereto. Then, the rotation angles are defined in turn according to an initialization order. In this way, the initialized eight face masks are placed at an interval of 45 degrees thereamong, so that the face mask sequence formed by the eight face masks is enclosed into a complete circle, thereby the face masks of the face mask sequence will be arranged in accordance with the preset circumferential direction when the face mask sequence is displayed.

In addition, the eight face masks can be configured with an algorithm to control the selection of the face masks and assigned with different deformation models, in this way, it is possible to realize that the motion of these face masks can be uniformly controlled in a system-level script.

Figure 4:
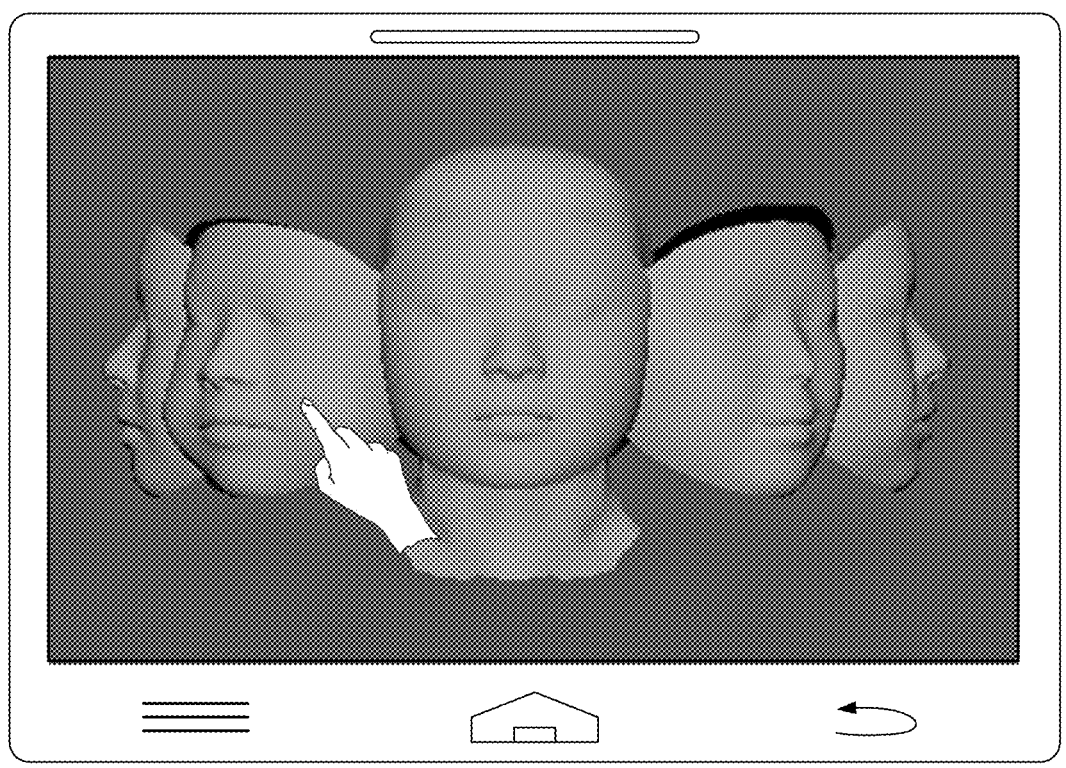
FIG. 4 is a schematic scenario diagram of a triggering process of a face image displaying method shown according to an example embodiment of the present disclosure.

After realizing the dynamic display of the face mask sequence in the rotation motion mode with the face of the object as the center and the overhead direction as the central axis, any mask of the face mask sequence can be triggered by a user to select a target face mask, so that the target face mask can be fused onto and displayed on the face of the object. FIG. 4 is a schematic scenario diagram of a triggering process of a face image displaying method shown according to an example embodiment of the present disclosure. As shown in FIG. 4, a user can select a mask of the face mask sequence as the target face mask by clicking on a screen.

After the triggering, the speed at which the face mask sequence rotates around the face of the object will first decrease until the target face mask moves directly in front of the face of the object. At this time, the rotation of the face mask sequence can be stopped, and the target face mask can be fused onto the face of the object for display. Furthermore, other face masks of the face mask sequence other than the target face mask can be faded out in accordance with a preset transparency change rule.

Figure 5:
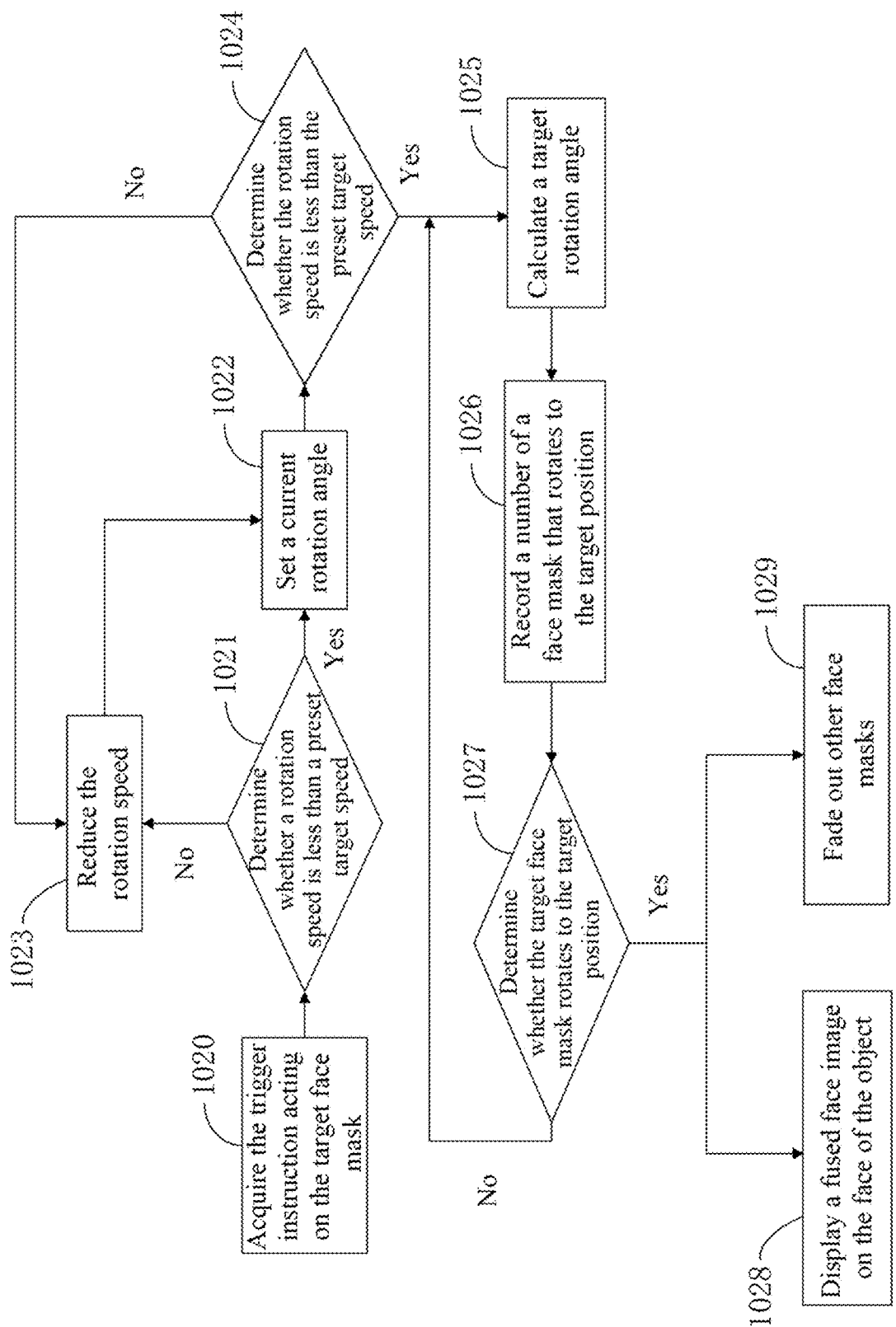
FIG. 5 is a schematic flowchart of fusing and displaying steps after a target face mask is triggered shown according to an example embodiment of the present disclosure.

In a possible design, FIG. 5 is a schematic flowchart of fusing and displaying steps after a target face mask is triggered shown according to an example embodiment of the present disclosure. As shown in FIG. 5, step 102 in the embodiment mentioned above may specifically include the following steps.

Step 1020, acquire the trigger instruction acting on the target face mask.

For example, a user can select a mask of the face mask sequence as the target face mask by clicking on a screen.

Step 1021, determine whether a rotation speed is less than a preset target speed; if the result of the determination is yes, proceed with step 1022; if the result of the determination is no, proceed with step 1023.

Step 1022, set a current rotation angle.

Step 1023, reduce the rotation speed.

Step 1024, determine whether the rotation speed is less than the preset target speed; if the result of the determination is yes, proceed with step 1025; if the result of the determination is no, proceed with step 1023.

Step 1025, calculate a target rotation angle.

After the target face mask of the face mask sequence is triggered, it is necessary to determine whether a rotation speed is less than a preset target speed, where the preset target speed may be a rotation speed threshold. If the result of the determination is yes, it means that the current rotation speed of the face mask is relatively slow, and the target face mask can be controlled to move to the target position by directly calculating a target rotation angle, for example, the position directly in front of the face of the object, and then a subsequent fusing and displaying operation can be performed. However, if the current rotation speed is greater than the preset target speed, controlling the target face mask to move to the target position by adopting directly the method of calculating the target rotation angle will cause the motion state trend of the face mask sequence to change too much, thereby resulting in poor interaction experience. Therefore, before calculating the target rotation angle, it is necessary to first reduce the rotation speed in such a way that the rotation speed is less than the preset target speed, and then perform the subsequent calculation of the target rotation angle, to control the target face mask to move to the target position. It is worth to note that the target rotation angle is a rotation angle at which the motion of the face mask is stopped. It is possible to continue to take the case that the face mask sequence includes eight face masks as an example for illustration. Since there must be a face mask directly in front of the user at stopping, and the rotation angle of the face mask is 0 at this time, the target rotation angle must be an integral multiple of 45.

Specifically, the target rotation angle of a respective face mask of the face mask sequence can be calculated by the following formula:

$$\delta = \text{floor}\left(\frac{\varphi}{45} + 1\right) \times 4$$

where δ is the target rotation angle, φ is the current rotation angle, and floor indicates acquisition of the largest integer less than the result in the brackets. The addition of 1 within the bracket can ensure that the direction of the relationship between the target angle and the current angle is consistent with the direction of rotation speed, and the current rotation angle is the current angle of a face corresponding to the respective face mask.

Step 1026, record a number of a face mask that rotates to the target position.

Specifically, when generating a face mask sequence, a number can be assigned to each face mask of the face mask sequence, and the number is used to uniquely identify each face mask, for example, the first face mask is assigned with a number 1, the second face mask is assigned with a number 2, the third face mask is assigned with a number 3, and the numbers are sequentially assigned until the eighth face mask is assigned with a number 8. During the rotation of the face mask sequence, the number of the face mask that rotates to the target position at a respective time instant is recorded at the current time. For example, at a first time instant, the first face mask corresponding to number 1 rotates to the target position; and at a second time instant, the second face mask corresponding to number 2 rotates to the target position.

Step 1027, determine whether the target face mask rotates to the target position; if the result of the determination is no, proceed with step 1025; if the result of the determination is yes, proceed with step 1028 and step 1029.

When the target face mask is directly in front of the face of the object, that is, the target rotation angle of the target face mask is 0, it indicates that the target face mask reaches the target position, and at this time, the rotation of the face mask sequence can be stopped.

Specifically, when the target face mask is triggered, the number corresponding to the target face mask is recorded; and during the rotation of the face mask sequence, if the number recorded at the current time is the number corresponding to the target face mask, it indicates that the target face mask is directly in front of the face of the object, and the rotation of the face mask sequence can be stopped at this time. For example, if the target face mask triggered by the user is the third face mask, the number 3 is recorded; and during the rotation of the face mask sequence, when the face mask corresponding to the recorded number 3 rotates to the target position, that is, it indicates that the third face mask rotates to the target position, then the rotation of the face mask sequence is stopped.

Step 1028, display a fused face image on the face of the object.

In an embodiment, the target face mask can be conformed to the face of the object in accordance with a preset path, and the target face mask and the face of the object can be fused to generate the fused face image, where the preset path points from a first position to a second position, and the first position is a position where the target face mask is currently located in the face mask sequence, and the second position is a position where the face of the object is currently located. In this step, the deviation value of the face mask in the Z-axis direction can be reduced, so as to realize the effect that all face masks move towards the face of the object by reducing a radius of a circle. Finally, the fused face image is displayed on the face of the object.

Step 1029, fade out other face masks.

In addition, other face masks other than the target face mask of the face mask sequence can be faded out in accordance with a preset transparency change rule. In this step, an alpha channel of a face mask that is not directly in front of the face of the object can be gradually lowered, where the alpha channel is used to adjust the transparency, so that the face mask that is not directly in front of the face of the object gradually becomes transparent. Specifically, for an implementation, reference can be made to the following formula:

$$alpha = \max((alpha' - \sigma_t \times \Delta t, 0))$$

where alpha is the transparency of a face mask at a current frame, alpha' is the transparency of the face mask at a previous frame, $\sigma_t$ is a time coefficient, and $\Delta t$ is a time difference between the current frame and the previous frame.

Figure 6:
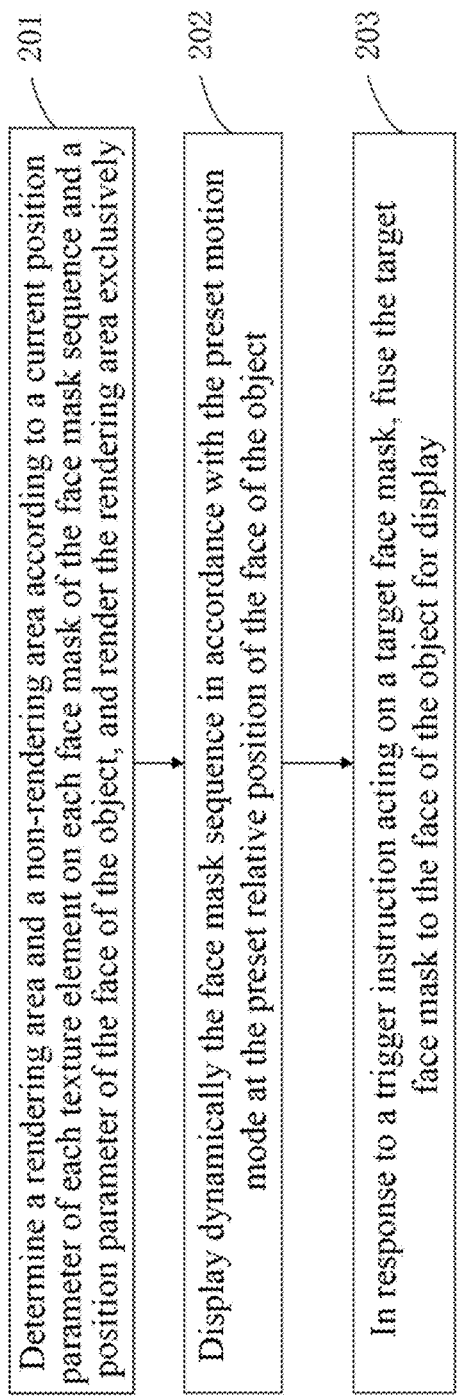
FIG. 6 is a schematic flowchart of a face image displaying method shown according to another example embodiment of the present disclosure.

FIG. 6 is a schematic flowchart of a face image displaying method shown according to another example embodiment of the present disclosure. As shown in FIG. 6, the face image displaying method provided according to this embodiment includes the following steps.

Step 201, determine a rendering area and a non-rendering area according to a current position parameter of each texture element on each face mask of the face mask sequence and a position parameter of the face of the object, and render the rendering area exclusively.

In this step, before the face mask sequence is displayed, each face mask needs to be rendered. If each face mask is rendered in an undifferentiated and omnidirectional manner, it is easy to lead to excessive rendering computation, which results in consuming too many computing resources. Accordingly, the rendering area and the non-rendering area can be determined according to the current position parameter of each texture element on each face mask of the face mask sequence and the position parameter of the face of the object, and only the rendering area can be rendered.

Figure 7:
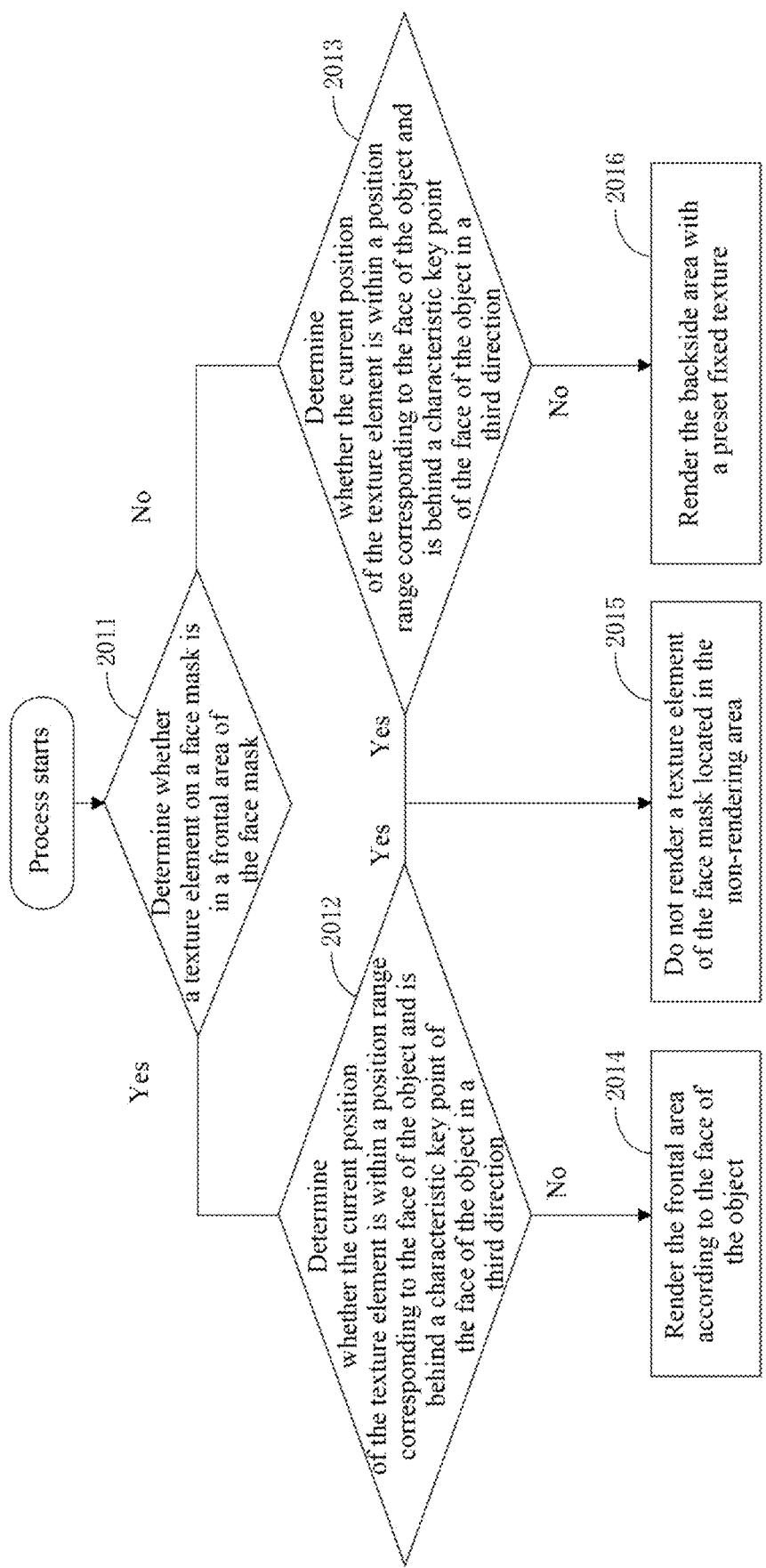
FIG. 7 is a schematic flowchart of rendering steps shown according to an example embodiment of the present disclosure.

Specifically, FIG. 7 is a schematic flowchart of rendering steps shown according to an example embodiment of the present disclosure. As shown in FIG. 7, the rendering steps mentioned above in this embodiment may include:

step 2011, determine whether a texture element on a face mask is in a frontal area of the face mask.

step 2012, if it is in the frontal area, determine whether the current position of the texture element is within a position range corresponding to the face of the object and is behind a characteristic key point of the face of the object in a third direction. If the result of the determination is yes, proceed with step 2015; if the result of the determination is no, proceed with step 2014.

It is worth understanding that the third direction may be a direction in which there is visual space occlusion between the face of the object and the face mask, for example, Z-axis direction in FIG. 3.

Step 2013, if it is in a backside area, determine whether the current position of the texture element is within a position range corresponding to the face of the object and is behind a characteristic key point of the face of the object in a third direction. If the result of the determination is yes, proceed with step 2015; if the result of the determination is no, proceed with step 2016.

In this embodiment, the frontal area and the backside area of the face mask can be completed by corresponding processing procedures, where a first processing procedure is only used for rendering the frontal area, and a second processing process is only used for rendering the backside area. However, the two processing procedures can share a texture element rendering engine for rendering, where the texture element rendering engine may sample the current face of the object to return a real-time portrait mask, so as to render the face mask.

Whether the texture element needs to be rendered can be determined after determining whether the current position of the texture element is within the position range corresponding to the face of the object and is behind the characteristic key point (e.g., sideburns position) of the face of the object in the third direction (e.g., Z-axis direction).

Specifically, when the current position of the texture element is within the position range corresponding to the face of the object, the texture element may be in front of or behind the face of the object. However, if the current position of the texture element is in front of the sideburns position of the face of the object in the Z-axis direction, it can be determined that the texture element is in front of the face of the object, and it can be seen that the texture element is a visible part to a user, and therefore the texture element needs to be rendered. However, if the current position of the texture element is behind the sideburns position of the face of the object in the Z-axis direction, it can be determined that the texture element is behind the face of the object, and it can be seen that the texture element is an invisible part to the user, and therefore the texture element does not need to be rendered, thereby avoiding the waste of computing resources caused by an unnecessary rendering process.

Step 2014, render the frontal area according to the face of the object.

Specifically, for a texture element of the face mask located in the rendering area, if it also belongs to the frontal area, the rendering can be performed according to the face of the object, to display the specific appearance of the face of the object corresponding to the face mask.

Step 2015, do not render a texture element of the face mask located in the non-rendering area.

For a texture element of the face mask located in the non-rendering area, no matter the texture element belongs to the frontal area or the backside area, it will not be rendered. It can be understood that the texture element in this area is set to be transparent.

Step 2016, render the backside area with a preset fixed texture.

For a texture element of the face mask that is located in the rendering area, but belongs to the backside area, then the rendering can be performed according to the preset fixed texture, for example, the texture element can be rendered with gray.

Figure 8:
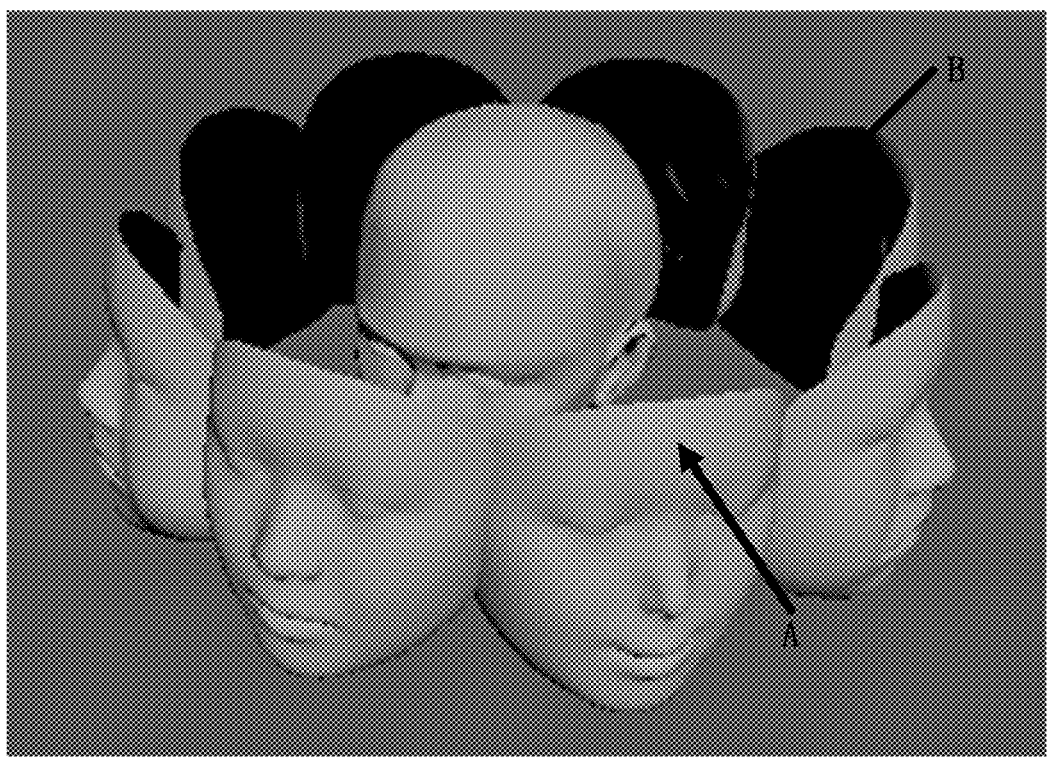
FIG. 8 is a schematic diagram of a rendered display result of the rendering steps shown in FIG. 7.

FIG. 8 is a schematic diagram of a rendered display result of the rendering steps shown in FIG. 7. As shown in FIG. 8, area A is located in the rendering area and belongs to the frontal area, and therefore it is rendered according to the face of the object, to display the specific appearance of the face of the object corresponding to the face mask; area B is located in the rendering area and belongs to the backside area, and therefore it is rendered with gray, for example.

Returning to FIG. 6, Step 202, display dynamically the face mask sequence in accordance with the preset motion mode at the preset relative position of the face of the object.

It is worth noting that reference can be made to the specific description of step 101 in the embodiment shown in FIG. 1 for the implementation of step 202 in this embodiment.

In addition, on the basis of step 101 in the embodiment shown in FIG. 1, when the face mask sequence is dynamically displayed in accordance with the preset motion mode, the determination of the speed of the preset motion can be made according to a physical feature of the user, for example, according to the mouth opening degree of the user, the smile degree of the user, and the related gesture of the user. Here, illustration can be made by taking an example where the speed of the preset motion is determined according to the mouth opening degree of the user. The rotation speed at which the face mask sequence rotates around the face of the object can increase with the mouth opening degree of the user, that is, the larger the mouth opening degree of the user, the faster the speed at which the face mask sequence rotates around the face of the object. It can be seen that the user, by adjusting the opening degree of the mouth, can accelerate and decelerate the rotation speed at which the face mask sequence rotates around the face of the object.

Specifically, a characteristic parameter of a target part on the face of the object can be obtained first, and then a rotation speed is determined according to the characteristic parameter, and the face mask sequence is displayed dynamically in accordance with the rotation speed. For example, a mouth characteristic parameter and an eye characteristic parameter of the face of the object can be obtained, where the mouth characteristic parameter includes a key point coordinate of an upper lip and a key point coordinate of a lower lip, and the eye characteristic parameter includes a key point coordinate of a left eye and a key point coordinate of a right eye. Then, a first coordinate difference in a first direction (for example, the Y-axis) is determined according to the key point coordinate of the upper lip and the key point coordinate of the lower lip, and a second coordinate difference in a second direction (for example, the X-axis) is determined according to the key point coordinate of the left eye and the key point coordinate of the right eye. Finally, the characteristic parameter is determined according to a ratio of the first coordinate difference to the second coordinate difference, where the characteristic parameter can be used to characterize the mouth opening degree. It is worth noting that by determining the mouth opening degree with the ratio of the first coordinate difference to the second coordinate difference, the fluctuation of the mouth opening degree caused by the change of the distance between the face of the object and a camera can be avoided.

If the characteristic parameter is less than or equal to a preset first threshold, the rotation speed is a first preset speed; if the characteristic parameter is greater than the preset first threshold, and a sum of the first preset speed and an additional speed is less than a second preset speed, the rotation speed is the sum of the first preset speed and the additional speed, where the additional speed is proportional to a characteristic parameter difference, and the characteristic parameter difference is a difference between the characteristic parameter and the preset first threshold; when the sum of the first preset speed and the additional speed is greater than or equal to the second preset speed, the rotation speed is determined as the second preset speed.

With the method mentioned above, the rotation speed of the face mask at the current frame can be calculated according to the mouth opening degree, and the specific calculation formula is:

$$\gamma = \min(\gamma_{min} + \max((D-d), 0) \times \sigma_\gamma, \gamma_{max})$$

where $\gamma$ is the rotation speed, $\gamma_{min}$ is a minimum rotation speed, D is the mouth opening degree, d is a mouth opening detection threshold, $\sigma_\gamma$ is a speed coefficient, and $\gamma_{max}$ is a maximum rotation speed. It is worth noting that the mouth opening detection threshold indicates determination of mouth opening only when the mouth opening degree is greater than that threshold, and the speed coefficient refers to a constant that needs to be multiplied when the mouth opening degree parameter is converted into the rotation speed.

It is worth noting that in the above-mentioned formula, the characteristic parameter mentioned above is the mouth opening degree D, the preset first threshold mentioned above is the mouth opening detection threshold d, the first preset speed is the minimum rotation speed $\gamma_{min}$, the additional speed is $(D-d) \times \sigma_\gamma$, and the second preset speed is the maximum rotation speed $\gamma_{max}$.

Therefore, through this step, the effect that the face mask sequence rotates around the face of the object at different rotation speeds can be realized by controlling the mouth opening degree.

In addition, the rotation angle of each face mask at the current frame can be set through the above determined rotation speed, and the specific formula is as follows:

$$\varphi=(\varphi'+\gamma\times\Delta t)\%360$$

where $\varphi$ is the rotation angle of the face mask at the current frame, $\varphi'$ is the rotation angle of the face mask at the previous frame, $\gamma$ is the rotation speed, and $\Delta t$ is the time difference between the current frame and the previous frame.

It is worth noting that the remainder operation at the formula tail of the above formula is to ensure that the rotation angle can be within the range of [0, 360], so as to prevent memory overflow caused by a too large number.

Step 203, in response to a trigger instruction acting on a target face mask, fuse the target face mask to the face of the object for display.

It is worth noting that reference can be made to the specific description of step 102 in the embodiment shown in FIG. 1 for the implementation of step 203 in this embodiment, which will not be repeated herein.

Figure 9:
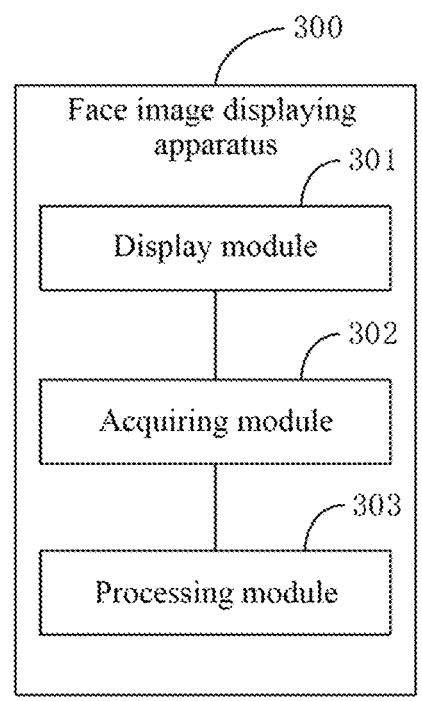
FIG. 9 is a schematic structure diagram of a face image displaying apparatus shown according to an example embodiment of the present disclosure.

FIG. 9 is a schematic structure diagram of a face image displaying apparatus shown according to an example embodiment of the present disclosure. As shown in FIG. 9, the face image displaying apparatus 300 provided according to this embodiment includes:

a display module 301, configured to display dynamically a face mask sequence in accordance with a preset motion mode at a preset relative position of a face of an object, where the face mask sequence includes a plurality of face masks corresponding to the face of the object;

an acquiring module 302, configured to acquire a trigger instruction acting on a target face mask; and a processing module 303, configured to fuse the target face mask to the face of the object, where the target face mask is any face mask of the face mask sequence;

where the display module 301 is further configured to display the face of the object after fusing the target face mask.

According to one or more embodiments of the present disclosure, the face mask sequence includes at least one deformed face mask corresponding to the face of the object.

According to one or more embodiments of the present disclosure, the display module 301 is specifically configured to:

with the face of the object as a center and an overhead direction of the face of the object as a central axis, display dynamically the face mask sequence in a rotation motion mode, where the face masks of the face mask sequence are arranged in a preset circumferential direction.

According to one or more embodiments of the present disclosure, the face masks of the face mask sequence are scaled face masks corresponding to the face of the object.

According to one or more embodiments of the present disclosure, the display module 301 is specifically configured to:

acquire a characteristic parameter of a target part on the face of the object;

determine a rotation speed of the rotation motion according to the characteristic parameter, and display dynamically the face mask sequence in accordance with the rotation speed.

According to one or more embodiments of the present disclosure, the acquiring module 302 is further configured to acquire a mouth characteristic parameter and an eye characteristic parameter of the face of the object, where the mouth characteristic parameter includes a key point coordinate of an upper lip and a key point coordinate of a lower lip, and the eye characteristic parameter includes a key point coordinate of a left eye and a key point coordinate of a right eye; and the processing module 303 is further configured to determine a first coordinate difference in a first direction according to the key point coordinate of the upper lip and the key point coordinate of the lower lip, and determine a second coordinate difference in a second direction according to the key point coordinate of the left eye and the key point coordinate of the right eye;

the processing module 303 is further configured to determine the characteristic parameter according to a ratio of the first coordinate difference to the second coordinate difference.

According to one or more embodiments of the present disclosure, the processing module 303 is specifically configured to:

if the characteristic parameter is less than or equal to a preset first threshold, determine the rotation speed as a first preset speed;

if the characteristic parameter is greater than the preset first threshold and a sum of the first preset speed and an additional speed is less than a second preset speed, determine the rotation speed as a sum of the first preset speed and the additional speed, where the additional speed is proportional to a characteristic parameter difference, and the characteristic parameter difference is a difference between the characteristic parameter and the preset first threshold;

when the sum of the first preset speed and the additional speed is greater than or equal to the second preset speed, determine the rotation speed as the second preset speed.

According to one or more embodiments of the present disclosure, the processing module 303 is further configured to determine whether the target face mask rotates to a target position, where the target position and the face of the object conform to a preset positional relationship.

According to one or more embodiments of the present disclosure, the target position is a position directly in front of the face of the object.

According to one or more embodiments of the present disclosure, the processing module 303 is further configured to: when the target face mask rotates to the target position, reduce a rotation speed of the rotation motion to a preset target speed.

According to one or more embodiments of the present disclosure, the processing module 303 is further configured to conform the target face mask to the face of the object in accordance with a preset path, and fuse the target face mask with the face of the object to generate a fused face image, where the preset path points from a first position to a second position, the first position is a position where the target face mask is currently located in the face mask sequence, and the second position is a position where the face of the object is currently located; and the display module 301 is further configured to display the fused face image on the face of the object.

According to one or more embodiments of the present disclosure, the display module 301 is further configured to fade out other face masks other than the target face mask of the face mask sequence in accordance with a preset transparency change rule.

According to one or more embodiments of the present disclosure, the processing module 303 is further configured to determine a rendering area and a non-rendering area according to a current position parameter of each texture element on each face mask of the face mask sequence and a position parameter of the face of the object, and render the rendering area exclusively.

According to one or more embodiments of the present disclosure, the processing module 303 is further configured to: if a current position of the texture element is located within a position range corresponding to the face of the object and is behind a characteristic key point of the face of the object in a third direction, determine that the texture element belongs to the non-rendering area.

According to one or more embodiments of the present disclosure, the processing module 303 is further configured to render the frontal area according to the face of the object;

the processing module 303 is further configured to render the backside area with a preset fixed texture.

It is worth noting that the face image displaying apparatus provided according to the embodiment shown in FIG. 9 can be used to execute the method provided according to any of the embodiments mentioned above, with similar implementations and technical effects, which will not be repeated herein.

Figure 10:
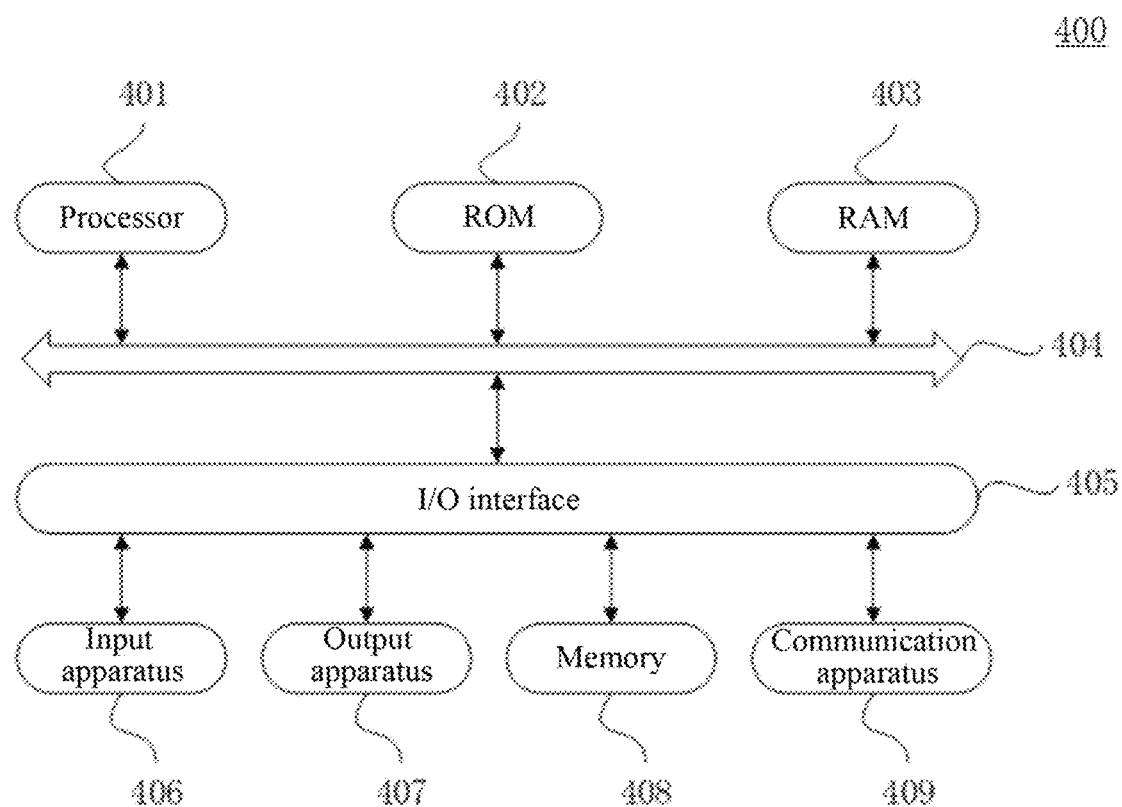
FIG. 10 is a schematic structure diagram of an electronic device shown according to an example embodiment of the present disclosure.

FIG. 10 is a schematic structure diagram of an electronic device shown according to an example embodiment of the present disclosure. FIG. 10 shows a schematic structure diagram of an electronic device 400 suitable for implementing the embodiments of the present disclosure. The terminal device in the embodiments of the present disclosure may include, but is not limited to, a mobile phone, a notebook computer, a digital broadcast receiver, a personal digital assistant(PDA), a tablet computer (PAD), a portable media player (PMP), a vehicular terminal (e.g., a vehicular navigation terminal) and other mobile terminals with an image acquiring function; as well as a digital TV, a desktop computer and other fixed terminals with an image acquiring device externally connected. The electronic device shown in FIG. 10 is only an example, and should not bring any limitation to the function and the scope of use of the embodiments of the present disclosure.

As shown in FIG. 10, the electronic device 400 may include a processor (for example, a central processor, a graphics processor, etc.) 401, which may perform various appropriate actions and processing according to a program stored in a read-only memory (ROM) 402 or a program loaded from a memory 408 to a random access memory (RAM) 403. In the RAM 403, various programs and data required for the operation of the electronic device 400 are also stored. The processor 401, ROM 402, and RAM 403 are connected to each other through a bus 404. An input/output (I/O) interface 405 is also connected to the bus 404. The memory is used to store programs for executing the methods described in the various method embodiments mentioned above; and the processor is configured to execute the programs stored in the memory.

Generally, the following apparatuses may be connected to the I/O interface 405: an input apparatus 406, including, for example, a touch screen, a touch panel, a keyboard, a mouse, a camera, a microphone, a accelerometer, a gyroscope and the like; an output apparatus 407, including, for example, a liquid crystal display (LCD), a speaker, a vibrator and the like; a memory 408, including, for example, a magnetic tape, a hard disk and the like; and a communication apparatus 409. The communication apparatus 409 may allow the electronic device 400 to perform wireless or wired communication with other devices to exchange data. Although FIG. 10 shows the electronic device 400 with various kinds of apparatuses, it should be understood that it is not required to implement or have all the apparatuses shown in FIG. 10. Alternatively, more or fewer apparatuses may be implemented or provided.

In particular, according to an embodiment of the present disclosure, the process described above with reference to the flowchart may be implemented as a computer software program. For example, an embodiment of the present disclosure includes a computer program product, which includes a computer program carried on a non-transient computer readable medium, and the computer program contains program codes for executing the method shown in the flowchart of an embodiment of the present disclosure. In such an embodiment, the computer program may be downloaded from a network through the communication apparatus 409 and installed, or installed from the memory 408, or installed from the ROM 402. When the computer program is executed by the processor 401, the above-mentioned functions defined in the methods of the embodiments of the present disclosure are executed.

It should be noted that, the above-mentioned computer readable medium in the present disclosure may be a computer readable signal medium, or a computer readable storage medium, or any combination thereof. The computer readable storage medium may be, for example, but not limited to, an electrical, magnetic, optical, electromagnetic, infrared, or semiconductor system, apparatus or device, or any combination thereof. More specific examples of the computer readable storage medium may include, but are not limited to: an electrically connected portable computer disk with one or more wires, a hard disk, a random access memory (RAM), a read-only memory (ROM), an erasable programmable read-only memory (EPROM or a flash), an optical fiber, a portable compact disc read-only memory (CD-ROM), an optical storage device, a magnetic storage device, or any suitable combination thereof. In the present disclosure, the computer readable storage medium may be any tangible medium that contains or stores a program, which may be used by or in combination with an instruction execution system, apparatus, or device. In the present disclosure, a computer readable signal medium may include a data signal propagated in a baseband or propagated as a part of a carrier wave, and program codes readable by a computer are carried therein. This propagated data signal may adopt many forms, including but not limited to, an electromagnetic signal, an optical signal, or any suitable combination thereof. The computer readable signal medium may also be any computer readable medium besides the computer readable storage medium, the computer readable signal medium may send, propagate, or transmit the program used by or in combination with the instruction execution system, apparatus, or device. The program codes contained on the computer readable medium may be transmitted by any suitable medium, including but not limited to: a wire, an optical cable, radio frequency (RF), etc., or any suitable combination thereof.

The above-mentioned computer readable medium may be included in the above-mentioned electronic device; or it may exist alone without being assembled into the electronic device.

The computer-readable medium carries one or more programs, and when the one or more programs are executed by the electronic device, the electronic device is caused to: display dynamically a face mask sequence in accordance with a preset motion mode at a preset relative position of a face of an object, where the face mask sequence includes a plurality of face masks corresponding to the face of the object; in response to a trigger instruction acting on a target face mask, fuse the target face mask to the face of the object for display, where the target face mask is any mask of the face mask sequence.

The computer program codes for performing the operations of the present disclosure may be written in one or more programming languages or a combination thereof. The above-mentioned programming language includes, but is not limited to, an object-oriented programming language—such as Java, Smalltalk, C++, and also includes a conventional procedural programming language such as "C" language or similar programming language. The program codes may be executed entirely on a computer of a user, partly on a computer of a user, executed as an independent software package, partly executed on a computer of a user and partly executed on a remote computer, or entirely executed on a remote computer or server. In a case where a remote computer is involved, the remote computer may be connected to a computer of a user through any kind of network including a local area network (LAN) or a wide area network (WAN), or may be connected to an external computer (for example, connected via the Internet through an Internet service provider).

In some implementations, a client and a server can communicate using any currently known network protocol such as hypertext transfer protocol (HTTP) or future developed network protocol, and can be interconnected with digital data communication of any form or medium (e.g., a communication network). Examples of the communication network include a local area network (LAN), a wide area network (WAN), an inter-network (e.g., the Internet), and a peer-to-peer network (e.g., an ad hoc peer-to-peer network), as well as any currently known or future developed network.

The flowcharts and block diagrams in the drawings illustrate architectures, functions, and operations of possible implementations of the system, method, and computer program product in accordance with various embodiments of the present disclosure. In this point, each block in the flowcharts or block diagrams may represent a module, a program segment, or a part of codes, and the module, the program segment, or the part of codes contains one or more executable instructions for implementing a designated logical function. It should also be noted that, in some alternative implementations, the functions marked in the blocks may also occur in a different order from the order marked in the drawings. For example, two blocks shown one after another may actually be executed substantially in parallel, or sometimes may be executed in a reverse order, which depends on the functions involved. It should also be noted that, each block in the block diagrams and/or flowcharts, and a combination of blocks in the block diagrams and/or flowcharts, may be implemented by a dedicated hardware-based system that performs designated functions or operations, or may be implemented by a combination of a dedicated hardware and computer instructions.

The modules involved in the description of the embodiments of the present disclosure may be implemented in software or hardware, where a name of a module does not constitute a limitation on the unit itself in a certain case. For example, the display module can also be described as "a unit that displays the face of the object and the face mask sequence".

The functions described above herein may be performed at least in part by one or more hardware logic components. For example, non-restrictively, exemplary types of hardware logic components that may be used include: a field programmable gate array (FPGA), an application specific integrated circuit (ASIC), an application specific standard part (ASSP), a system on chip (SOC), a complex programmable logic device (CPLD), etc.

In the context of the present disclosure, a machine-readable medium may be a tangible medium that can contain or store a program for use by or in combination with an instruction execution system, apparatus or device. The machine-readable medium may be a machine-readable signal medium or a machine-readable storage medium. The machine-readable medium can include, but is not limited to, an electronic, magnetic, optical, electromagnetic, infrared, or semiconductor system, apparatus or device, or any suitable combination thereof. More specific examples of the machine readable storage medium may include an electrically connected portable computer disk based on one or more wires, a hard disk, a random access memory (RAM), a read-only memory (ROM), an erasable programmable read-only memory (EPROM or flash memory), an optical fiber, a portable compact disc read-only memory (CD-ROM), an optical storage device, a magnetic storage device, or any suitable combination thereof.

In a first aspect, according to one or more embodiments of the present disclosure, a face image displaying method is provided, including:
  displaying dynamically a face mask sequence in accordance with a preset motion mode at a preset relative position of a face of an object, where the face mask sequence includes a plurality of face masks corresponding to the face of the object;
  in response to a trigger instruction acting on a target face mask, fusing the target face mask to the face of the object for display, where the target face mask is any face mask of the face mask sequence.

According to one or more embodiments of the present disclosure, the face mask sequence includes at least one deformed face mask corresponding to the face of the object.

According to one or more embodiments of the present disclosure, the displaying dynamically the face mask sequence in accordance with the preset motion mode at the preset relative position of the face of the object includes:
  with the face of the object as a center and an overhead direction of the face of the object as a central axis, displaying dynamically the face mask sequence in a rotation motion mode, where the face masks of the face mask sequence are arranged in a preset circumferential direction.

According to one or more embodiments of the present disclosure, the face masks of the face mask sequence are scaled face masks corresponding to the face of the object.

According to one or more embodiments of the present disclosure, the displaying dynamically the face mask sequence in the rotation motion mode includes:
  acquiring a characteristic parameter of a target part on the face of the object;
  determining a rotation speed of the rotation motion according to the characteristic parameter, and displaying dynamically the face mask sequence in accordance with the rotation speed.

According to one or more embodiments of the present disclosure, the acquiring the characteristic parameter of the target part on the face of the object includes:

acquiring a mouth characteristic parameter and an eye characteristic parameter of the face of the object, where the mouth characteristic parameter includes a key point coordinate of an upper lip and a key point coordinate of a lower lip, and the eye characteristic parameter includes a key point coordinate of a left eye and a key point coordinate of a right eye;

determining a first coordinate difference in a first direction according to the key point coordinate of the upper lip and the key point coordinate of the lower lip, and determining a second coordinate difference in a second direction according to the key point coordinate of the left eye and the key point coordinate of the right eye;

determining the characteristic parameter according to a ratio of the first coordinate difference to the second coordinate difference.

According to one or more embodiments of the present disclosure, the determining the rotation speed according to the characteristic parameter includes:

if the characteristic parameter is less than or equal to a preset first threshold, determining the rotation speed as a first preset speed;

if the characteristic parameter is greater than the preset first threshold and a sum of the first preset speed and an additional speed is less than a second preset speed, determining the rotation speed as a sum of the first preset speed and the additional speed, where the additional speed is proportional to a characteristic parameter difference, and the characteristic parameter difference is a difference between the characteristic parameter and the preset first threshold;

when the sum of the first preset speed and the additional speed is greater than or equal to the second preset speed, determining the rotation speed as the second preset speed.

According to one or more embodiments of the present disclosure, before the fusing the target face mask to the face of the object for display, further including:

determining whether the target face mask rotates to a target position, where the target position and the face of the object conform to a preset positional relationship.

According to one or more embodiments of the present disclosure, the target position is a position directly in front of the face of the object.

According to one or more embodiments of the present disclosure, when the target face mask rotates to the target position, reducing a rotation speed of the rotation motion to a preset target speed.

According to one or more embodiments of the present disclosure, the fusing the target face mask to the face of the object for display includes:

conforming the target face mask to the face of the object in accordance with a preset path, and fusing the target face mask with the face of the object to generate a fused face image, where the preset path points from a first position to a second position, the first position is a position where the target face mask is currently located in the face mask sequence, and the second position is a position where the face of the object is currently located; and displaying the fused face image on the face of the object.

According to one or more embodiments of the present disclosure, the fusing the target face mask to the face of the object for display further includes:

fading out other face masks other than the target face mask of the face mask sequence in accordance with a preset transparency change rule.

According to one or more embodiments of the present disclosure, the face image displaying method further includes:

determining a rendering area and a non-rendering area according to a current position parameter of each texture element on each face mask of the face mask sequence and a position parameter of the face of the object, and rendering the rendering area exclusively.

According to one or more embodiments of the present disclosure, the determining the rendering area and the non-rendering area according to the current position parameter of each texture element on each face mask of the face mask sequence and the position parameter of the face of the object includes:

if a current position of the texture element is located within a position range corresponding to the face of the object and is behind a characteristic key point of the face of the object in a third direction, determining that the texture element belongs to the non-rendering area.

According to one or more embodiments of the present disclosure, the rendering area includes a frontal area and a backside area, and the rendering the rendering area includes:

rendering the frontal area according to the face of the object;

rendering the backside area with a preset fixed texture.

In a second aspect, according to one or more embodiments of the present disclosure, a face image displaying apparatus is provided, which includes:

a display module, configured to display dynamically a face mask sequence in accordance with a preset motion mode at a preset relative position of a face of an object, where the face mask sequence includes a plurality of face masks corresponding to the face of the object;

an acquiring module, configured to acquire a trigger instruction acting on a target face mask; and a processing module, configured to fuse the target face mask to the face of the object, where the target face mask is any face mask of the face mask sequence;

where the display module is further configured to display the face of the object to which the target face mask is fused.

According to one or more embodiments of the present disclosure, the face mask sequence includes at least one deformed face mask corresponding to the face of the object.

According to one or more embodiments of the present disclosure, the display module is specifically configured to:

with the face of the object as a center and an overhead direction of the face of the object as a central axis, display dynamically the face mask sequence in a rotation motion mode, where the face masks of the face mask sequence are arranged in a preset circumferential direction.

According to one or more embodiments of the present disclosure, the face masks of the face mask sequence are scaled face masks corresponding to the face of the object.

According to one or more embodiments of the present disclosure, the display module is specifically configured to:

acquire a characteristic parameter of a target part on the face of the object;

determine a rotation speed of the rotation motion according to the characteristic parameter, and display dynamically the face mask sequence in accordance with the rotation speed.

According to one or more embodiments of the present disclosure, the acquiring module is further configured to acquire a mouth characteristic parameter and an eye characteristic parameter of the face of the object, where the mouth characteristic parameter includes a key point coordinate of an upper lip and a key point coordinate of a lower lip, and the eye characteristic parameter includes a key point coordinate of a left eye and a key point coordinate of a right eye;

the processing module is further configured to determine a first coordinate difference in a first direction according to the key point coordinate of the upper lip and the key point coordinate of the lower lip, and determine a second coordinate difference in a second direction according to the key point coordinate of the left eye and the key point coordinate of the right eye;

the processing module is further configured to determine the characteristic parameter according to a ratio of the first coordinate difference to the second coordinate difference.

According to one or more embodiments of the present disclosure, the processing module is specifically configured to:

if the characteristic parameter is less than or equal to a preset first threshold, determine the rotation speed as a first preset speed;

if the characteristic parameter is greater than the preset first threshold and a sum of the first preset speed and an additional speed is less than a second preset speed, determine the rotation speed as a sum of the first preset speed and the additional speed, where the additional speed is proportional to a characteristic parameter difference, and the characteristic parameter difference is a difference between the characteristic parameter and the preset first threshold;

when the sum of the first preset speed and the additional speed is greater than or equal to the second preset speed, determine the rotation speed as the second preset speed.

According to one or more embodiments of the present disclosure, the processing module is further configured to determine whether the target face mask rotates to a target position, where the target position and the face of the object conform to a preset positional relationship.

According to one or more embodiments of the present disclosure, the target position is a position directly in front of the face of the object.

According to one or more embodiments of the present disclosure, the processing module is further configured to when the target face mask rotates to the target position, reduce a rotation speed of the rotation motion to a preset target speed.

According to one or more embodiments of the present disclosure, the processing module is further configured to conform the target face mask to the face of the object in accordance with a preset path, and fuse the target face mask with the face of the object to generate a fused face image, where the preset path points from a first position to a second position, the first position is a position where the target face mask is currently located in the face mask sequence, and the second position is a position where the face of the object is currently located; and the display module is further configured to display the fused face image on the face of the object.

According to one or more embodiments of the present disclosure, the display module is further configured to fade out other face masks other than the target face mask of the face mask sequence in accordance with a preset transparency change rule.

According to one or more embodiments of the present disclosure, the processing module is further configured to determine a rendering area and a non-rendering area according to a current position parameter of each texture element on each face mask of the face mask sequence and a position parameter of the face of the object, and render the rendering area exclusively.

According to one or more embodiments of the present disclosure, the processing module is further configured to: if a current position of the texture element is located within a position range corresponding to the face of the object and is behind a characteristic key point of the face of the object in a third direction, determine that the texture element belongs to the non-rendering area.

According to one or more embodiments of the present disclosure, the processing module is further configured to render the frontal area according to the face of the object;

the processing module is further configured to render the backside area with a preset fixed texture.

In a third aspect, an embodiment of the present disclosure provides an electronic device, including:

at least one processor and a memory;

where the memory stores computer-executable instructions; and the at least one processor executes the computer-executable instructions stored in the memory, so that the face image displaying method according to the first aspect and various possible designs of the first aspect mentioned above is executed by the at least one processor.

In a fourth aspect, an embodiment of the present disclosure provides a computer-readable storage medium, in which computer-executable instructions are stored, where the computer-executable instructions, when executed by a processor, implement the face image displaying method according to the first aspect and various possible designs of the first aspect mentioned above.

In a fifth aspect, an embodiment of the present disclosure provides a computer program product, including a computer program, where the computer program, when executed by a processor, implements the face image displaying method according to the first aspect and various possible designs of the first aspect mentioned above.

In a sixth aspect, an embodiment of the present disclosure provides a computer program. The computer program, when executed by a processor, implements the face image displaying method according to the first aspect and various possible designs of the first aspect mentioned above.

The above description is merely intended for preferred embodiments of the present disclosure and an illustration of the applied technical principles. Those skilled in the art should understand that, the disclosure scope involved in the present disclosure is not limited to the technical solutions formed by a specific combination of the above technical features, but also should cover other technical solutions formed by an arbitrary combination of the above technical features or their equivalent features without departing from the above disclosure concept, for example, a technical solution formed by a replacement of the above features with disclosed (but not limited to) technical features with similar functions in the present disclosure.

In addition, although respective operations are described in a specific order, this should not be understood as requiring these operations to be performed in the specific order shown or in a sequential order. Under certain circumstances, multitasking and parallel processing may be advantageous. Similarly, although several specific implementation details are included in the above discussion, these should not be construed as limiting the scope of the present disclosure. Certain features described in the context of separate embodiments may also be implemented in combination in a single embodiment. Conversely, various features described in the context of a single embodiment may also be implemented in multiple embodiments individually or in any suitable subcombination.

Although the subject matter has been described in language specific to structural features and/or method logical actions, it should be understood that the subject matter defined in the appended claims is not limited to the specific features or actions described above. On the contrary, the specific features and actions described above are only example forms for implementing the claims.

What is claimed is:

1. A face image displaying method, comprising:
displaying dynamically a face mask sequence in accordance with a preset motion mode at a preset relative position of a face of an object, wherein the face mask sequence comprises a plurality of face masks corresponding to the face of the object; and
in response to a trigger instruction acting on a target face mask, fusing the target face mask to the face of the object for display, wherein the target face mask is any face mask of the face mask sequence,
wherein the displaying dynamically the face mask sequence in accordance with the preset motion mode at the preset relative position of the face of the object comprises:
with the face of the object as a center and an overhead direction of the face of the object as a central axis, displaying dynamically the face mask sequence in a rotation motion mode, wherein the face masks of the face mask sequence are arranged in a preset circumferential direction,
wherein the displaying dynamically the face mask sequence in the rotation motion mode comprises:
acquiring a characteristic parameter of a target part on the face of the object; and
determining a rotation speed of the rotation motion according to the characteristic parameter, and displaying dynamically the face mask sequence in accordance with the rotation speed, and
wherein the acquiring the characteristic parameter of the target part on the face of the object comprises:
acquiring a mouth characteristic parameter and an eye characteristic parameter of the face of the object, wherein the mouth characteristic parameter comprises a key point coordinate of an upper lip and a key point coordinate of a lower lip, and the eye characteristic parameter comprises a key point coordinate of a left eye and a key point coordinate of a right eye;
determining a first coordinate difference in a first direction according to the key point coordinate of the upper lip and the key point coordinate of the lower lip, and determining a second coordinate difference in a second direction according to the key point coordinate of the left eye and the key point coordinate of the right eye; and
determining the characteristic parameter according to a ratio of the first coordinate difference to the second coordinate difference.

2. The face image displaying method according to claim 1, wherein the face mask sequence comprises at least one deformed face mask corresponding to the face of the object.

3. The face image displaying method according to claim 1, wherein the face masks of the face mask sequence are scaled face masks corresponding to the face of the object.

4. The face image displaying method according to claim 1, wherein the determining the rotation speed of the rotation motion according to the characteristic parameter comprises:
if the characteristic parameter is less than or equal to a preset first threshold, determining the rotation speed as a first preset speed;
if the characteristic parameter is greater than the preset first threshold and a sum of the first preset speed and an additional speed is less than a second preset speed, determining the rotation speed as a sum of the first preset speed and the additional speed, wherein the additional speed is proportional to a characteristic parameter difference, and the characteristic parameter difference is a difference between the characteristic parameter and the preset first threshold;
when the sum of the first preset speed and the additional speed is greater than or equal to the second preset speed, determining the rotation speed as the second preset speed.

5. The face image displaying method according to claim 1, before the fusing the target face mask to the face of the object for display, further comprising:
determining whether the target face mask rotates to a target position, wherein the target position and the face of the object conform to a preset positional relationship.

6. The face image displaying method according to claim 5, wherein the target position is a position directly in front of the face of the object.

7. The face image displaying method according to claim 6, when the target face mask rotates to the target position, reducing a rotation speed of the rotation motion to a preset target speed.

8. The face image displaying method according to claim 1, wherein the fusing the target face mask to the face of the object for display comprises:
conforming the target face mask to the face of the object in accordance with a preset path, and fusing the target face mask with the face of the object to generate a fused face image, wherein the preset path points from a first position to a second position, the first position is a position at which the target face mask is currently located in the face mask sequence, and the second position is a position at which the face of the object is currently located; and
displaying the fused face image on the face of the object.

9. The face image displaying method according to claim 8, wherein the fusing the target face mask to the face of the object for display further comprises:
fading out other face masks other than the target face mask of the face mask sequence in accordance with a preset transparency change rule.

10. The face image displaying method according to claim 1, further comprising:
determining a rendering area and a non-rendering area according to a current position parameter of each texture element on each face mask of the face mask sequence and a position parameter of the face of the object, and rendering the rendering area exclusively.

11. The face image displaying method according to claim 10, wherein the determining the rendering area and the non-rendering area according to the current position parameter of each texture element on each face mask of the face mask sequence and the position parameter of the face of the object comprises:
if a current position of the texture element is located within a position range corresponding to the face of the object and is behind a characteristic key point of the face of the object in a third direction, determining that the texture element belongs to the non-rendering area.

12. The face image displaying method according to claim 11, wherein the rendering area comprises a frontal area and a backside area, and the rendering the rendering area comprises:
rendering the frontal area according to the face of the object;
rendering the backside area with a preset fixed texture.

13. A face image displaying apparatus, comprising:
at least one processor and a memory;
wherein the memory stores computer-executable instructions; and the at least one processor executes the computer-executable instructions stored in the memory to:
display dynamically a face mask sequence in accordance with a preset motion mode at a preset relative position of a face of an object, wherein the face mask sequence comprises a plurality of face masks corresponding to the face of the object;
acquire a trigger instruction acting on a target face mask;
fuse the target face mask to the face of the object, wherein the target face mask is any face mask of the face mask sequence; and
display the face of the object to which the target face mask is fused,
wherein the at least one processor further executes the computer-executable instructions stored in the memory to:
acquire a mouth characteristic parameter and an eye characteristic parameter of the face of the object, wherein the mouth characteristic parameter comprises a key point coordinate of an upper lip and a key point coordinate of a lower lip, and the eye characteristic parameter comprises a key point coordinate of a left eye and a key point coordinate of a right eye;
determine a first coordinate difference in a first direction according to the key point coordinate of the upper lip and the key point coordinate of the lower lip, and determining a second coordinate difference in a second direction according to the key point coordinate of the left eye and the key point coordinate of the right eye;
determine a characteristic parameter of a target part on the face of the object according to a ratio of the first coordinate difference to the second coordinate difference; and
determine a rotation speed of a rotation motion according to the characteristic parameter, and with the face of the object as a center and an overhead direction of the face of the object as a central axis, displaying dynamically the face mask sequence in the rotation motion mode in accordance with the rotation speed, wherein the face masks of the face mask sequence are arranged in a preset circumferential direction.

14. The face image displaying apparatus according to claim 13, wherein the face mask sequence comprises at least one deformed face mask corresponding to the face of the object.

15. The face image displaying apparatus according to claim 13, wherein the at least one processor executes the computer-executable instructions stored in the memory to:
determine a rendering area and a non-rendering area according to a current position parameter of each texture element on each face mask of the face mask sequence and a position parameter of the face of the object, and render the rendering area exclusively.

16. The face image displaying apparatus according to claim 13, wherein the face masks of the face mask sequence are scaled face masks corresponding to the face of the object.

17. The face image displaying apparatus according to claim 13, wherein the at least one processor further executes the computer-executable instructions stored in the memory to:
if the characteristic parameter is less than or equal to a preset first threshold, determine the rotation speed as a first preset speed;
if the characteristic parameter is greater than the preset first threshold and a sum of the first preset speed and an additional speed is less than a second preset speed, determine the rotation speed as a sum of the first preset speed and the additional speed, wherein the additional speed is proportional to a characteristic parameter difference, and the characteristic parameter difference is a difference between the characteristic parameter and the preset first threshold;
when the sum of the first preset speed and the additional speed is greater than or equal to the second preset speed, determine the rotation speed as the second preset speed.

18. A non-transitory computer-readable storage medium, in which computer-executable instructions are stored, wherein when the computer-executable instructions are executed by a processor, the processor is caused to:
display dynamically a face mask sequence in accordance with a preset motion mode at a preset relative position of a face of an object, wherein the face mask sequence comprises a plurality of face masks corresponding to the face of the object;
acquire a trigger instruction acting on a target face mask;
fuse the target face mask to the face of the object, wherein the target face mask is any face mask of the face mask sequence; and
display the face of the object to which the target face mask is fused,
wherein when the computer-executable instructions are executed by the processor, the processor is further caused to:
acquire a mouth characteristic parameter and an eye characteristic parameter of the face of the object, wherein the mouth characteristic parameter comprises a key point coordinate of an upper lip and a key point coordinate of a lower lip, and the eye characteristic parameter comprises a key point coordinate of a left eye and a key point coordinate of a right eye;
determine a first coordinate difference in a first direction according to the key point coordinate of the upper lip and the key point coordinate of the lower lip, and determining a second coordinate difference in a second direction according to the key point coordinate of the left eye and the key point coordinate of the right eye;
determine a characteristic parameter of a target part on the face of the object according to a ratio of the first coordinate difference to the second coordinate difference; and
determine a rotation speed of a rotation motion according to the characteristic parameter, and with the face of the object as a center and an overhead direction of the face of the object as a central axis, displaying dynamically the face mask sequence in the rotation motion mode in accordance with the rotation speed, wherein the face masks of the face mask sequence are arranged in a preset circumferential direction.

19. The non-transitory computer-readable storage medium according to claim 18, wherein the face mask sequence comprises at least one deformed face mask corresponding to the face of the object.

20. The non-transitory computer-readable storage medium according to claim 18, wherein the face masks of the face mask sequence are scaled face masks corresponding to the face of the object.

* * * * *